June 11, 1968     T. SENDZIMIR     3,387,357
METHOD OF MAKING CLAD METAL
Filed March 29, 1963     3 Sheets-Sheet 1
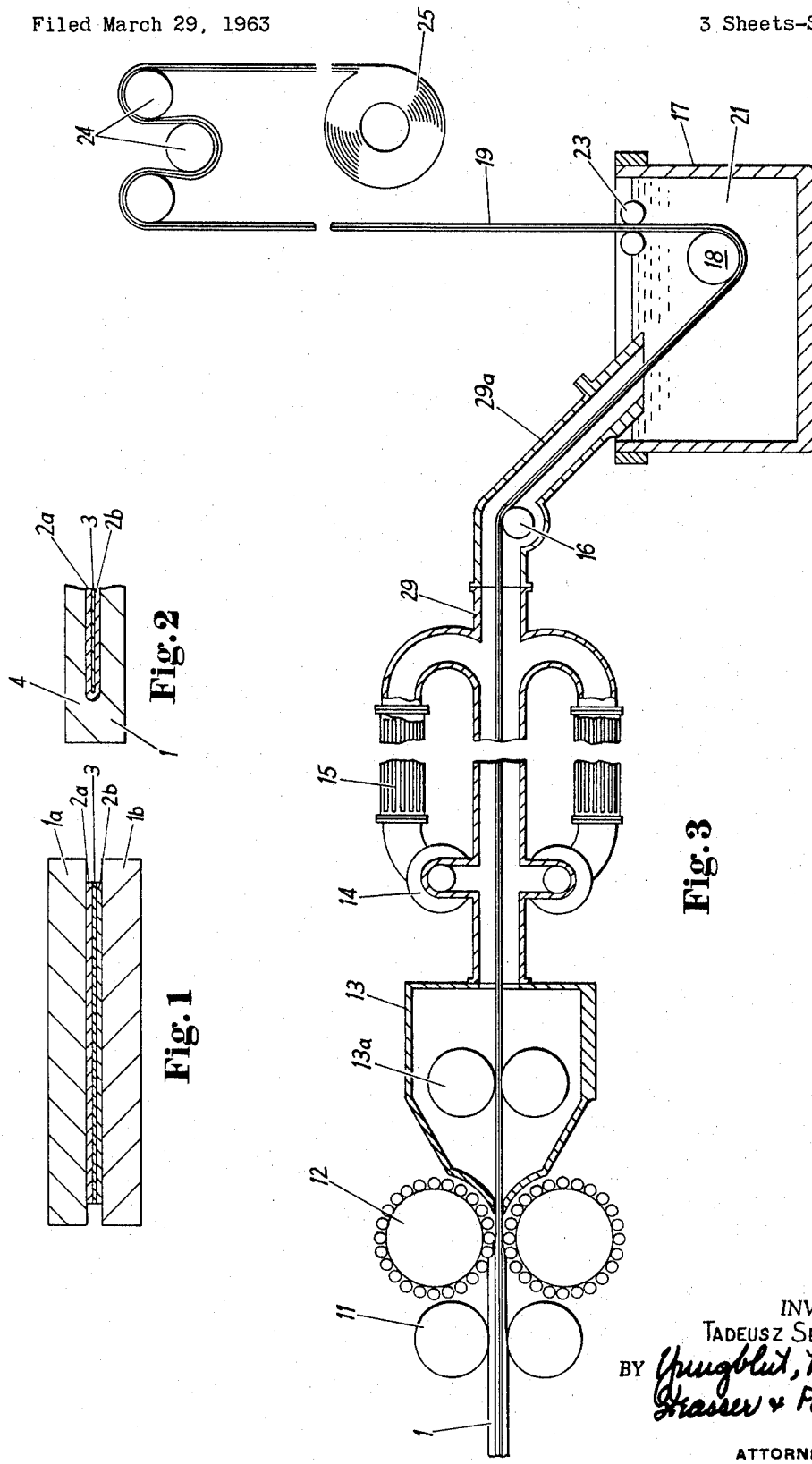
INVENTOR.
TADEUSZ SENDZIMIR,
BY
ATTORNEYS.

June 11, 1968  T. SENDZIMIR  3,387,357

METHOD OF MAKING CLAD METAL

Filed March 29, 1963  3 Sheets-Sheet 2

INVENTOR.
TADEUSZ SENDZIMIR,
BY
ATTORNEYS.

June 11, 1968     T. SENDZIMIR     3,387,357

METHOD OF MAKING CLAD METAL

Filed March 29, 1963     3 Sheets-Sheet 3

INVENTOR.
TADEUSZ SENDZIMIR,
BY *Yungblut, Melville,*
*Shasser + Foster,*

ATTORNEYS.

United States Patent Office 3,387,357
Patented June 11, 1968

3,387,357
METHOD OF MAKING CLAD METAL
Tadeusz Sendzimir, c/o T. Sendzimir, Inc.,
Waterbury, Conn.
Filed Mar. 29, 1963, Ser. No. 269,028
10 Claims. (Cl. 29—494)

This invention relates to the manufacture of clad metal strips, by which is meant, broadly, a composite sheet or strip-like structure made of a first metal forming the body (hereinafter called the base metal) having a covering on one or both of its major surfaces of a dissimilar metal or alloy (hereinafter referred to as the cladding metal). The use of the terms just mentioned is not intended to set limitations as to the relative thicknesses of the layers of base and cladding metals, although in general the base metal will form a body of substantial thickness as respects the total thickness of the composite, the layer or layers of the cladding metal being relied upon to impart some special quality which the base metal does not have, such as corrosion resistance, appearance, and the like. Frequently the cladding metal is more expensive than the base metal so that another reason is provided for making it comparatively thinner.

There are various ways in which one metal can be provided with a coating of another. Hot coating, e.g. galvanizing, electroplating, and the use of spray guns are typical of ways in which a base metal body can be provided with a coating of a dissimilar metal; but this application is not concerned with such expedients. Rather, it is concerned with procedures in which the base metal and the cladding metal are first joined together by what amounts to a welding operation in a procedure in which rolling, i.e. reduction in thickness of the composite article is practiced. It has long been known that if sheets or slabs of dissimilar metals are adequately welded together at the interface, the composite may then be reduced in rolling mills to provide a clad structure of any desired thickness less than the initial thickness of the composite.

In United States Patent 2,710,550, issued June 14, 1955, types of planetary rolling mills are described, which mills act upon a slab or the like at elevated temperatures and produce a very great reduction therein. Thus it is possible, using such mills to start with the heated slab of iron or ferrous alloy and reduce it to sheet gauge in the single pass through the planetary mill. It was further discovered and set forth in the same patent that such mills could be used for cladding operations. It was found possible to pass into the bite of the mill along with the slab to be reduced at high temperature, one or more strips of a dissimilar metal having a relatively lower temperature. Despite the larger reduction being produced in the base metal slab, it was found that the cladding strip or strips would not pull apart during the rolling operation but instead would become welded to an outer surface or surfaces of the base metal slab. The last mentioned action could be facilitated at certain mill adjustments by a self-scarfing action of the slab surfaces, resulting in removal of some of the surface metal of the slab and the presentation of fresh, unoxidized slab surfaces to the cladding strip or strips. This is illustrated and described in the aforesaid Patent 2,710,550.

It is easier to accomplish cladding with some metals than with others. For example, certain corrosion resisting elements such as chromium and alloys containing it have an apparent high resistance to chemical attack because they become quickly covered by an invisibly thin, very hard and impermeable coating of chromic oxide. The oxide coating makes it very difficult for alloys containing considerable amounts of chromium to be welded or bonded to other metals under pressure and deformation whether or not at elevated temperatures. This difficulty has long been recognized, and high chromium alloys (typically but not necessarily "stainless steel") have usually been first chemically cleaned and then electroplated with a layer of metal which presents no such difficulty, before layers of base and cladding metals are superposed to form a clad structure or laminate. Where stainless steel is being joined to iron, suitable metals to be electroplated on the stainless steel include, but without limitation, nickel or iron.

This difficulty is substantially reduced when a metal composite is hot rolled on a planetary mill as above set forth. Reductions of a base metal slab to one-twentieth or even to one-fiftieth of the original thickness are not unusual in such mills. The tremendous increase of the contact areas of the dissimilar metals, occurring within a small fraction of a second and under a pressure in the mill bite which excludes the presence of atmospheric air, offers an excellent means of producing solid bonds, for example, between low carbon, nonalloyed steel as a base metal and stainless steel as a cladding metal; and it further renders unnecessary the preliminary electroplating of the stainless steel with nickel or iron.

However, in cladding in a planetary mill as above described, difficulty is encountered when the feeding speed is low with respect to the translation speed of the working rolls in the planetary assemblies. It has been found that this difficulty arises because of the tendency of very rapidly moving working rolls to extract heat from the surface layer of the metal being fed into the mill. In the case of clad metal composites the surface layer will, of course, be a relatively thin layer of stainless steel. The difficulty can frequently be alleviated by placing dummy strips outside the surface strip of cladding metal. This has the effect of obviating direct contact of the working rolls with the cladding strip. The expedient may be found uneconomical unless a ready market can be found for the dummy sheets in the rolled condition. It is frequently desirable in the use of planetary mills to employ a high relative speed of translation of the working rolls in order to produce a rolled product which is not subject to recurring changes in thickness.

One of the primary objects of this invention is the provision of a mode of producing clad metal in a planetary mill or reducing instrumentality capable of making a large reduction in the thickness of metal pieces, which process will be free of the difficulties outlined above.

Another primary object of the invention is the provision of a method and apparatus for producing a type of clad metal which is new per se and has advantages as a marketable product, which advantages are not attained by former clad metal structures.

Other objects of the invention include the provision of apparatus for carrying on the processes outlined above, as well as the attainment of economies in the manufacture of clad structures.

These and other objects of the invention which will be set forth hereinafter or will be apparent to one skilled in the art upon reading these specifications are accomplished in those procedures and by the use of that apparatus of which certain exemplary embodiments will now be described. Reference is made to the drawings forming part of this application, and in which:

FIG. 1 is a cross sectional view of a slab sandwich such as may be rolled on a planetary mill.

FIG. 2 is a cross sectional view of a portion of the structure of FIG. 1 after reduction, the thickness scale of FIG. 2 for clarity being somewhat enlarged as respects the thickness scale of FIG. 1.

FIG. 3 is a schematic longitudinal view of apparatus for making a rolled clad structure and subsequently treating it in accordance with one of the modifications of this invention.

Figure 4:
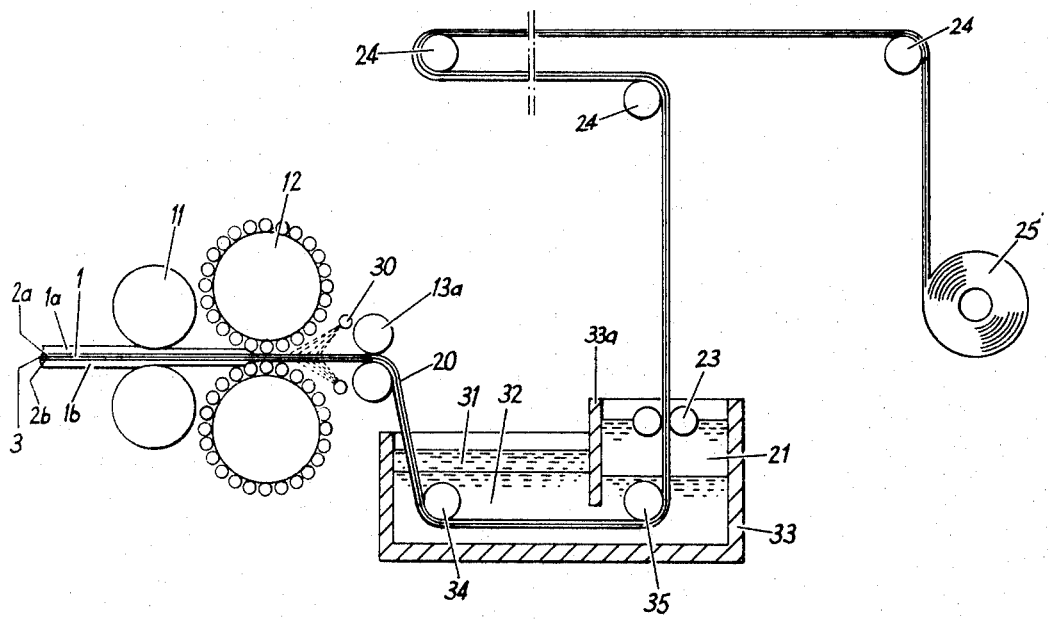
FIG. 4 is a schematic view of a modification of the procedure illustrated in FIG. 3.

The objects of the invention are generally attained by steps including the cladding of base metal during rolling, but in a new way. The ordinary procedure is in a sense reversed; but in spite of a seemingly more complex sequence of operations, it has been found possible in accordance with the teachings of this invention to obtain consistently excellent products with negligible scrap losses and at a great savings in cost.

Whereas in the procedure of cladding as described in the said U.S. Letters Patent 2,710,550, a base metal slab, being reduced in a planetary mill is faced on both outer sides with relatively thin strips of the cladding metal, in the practice of the present invention the strips are placed together and between slabs of the base metal, and the sandwich so formed is rolled in the planetary mill. The relatively thin strips of the cladding metal will be separated by a material which will prevent permanent adhesion; and the thickness of the elements making up the so-called sandwich will be so chosen as to lie within the capabilities of the planetary mill for reduction. It is desirable to have the strips of cladding metal somewhat narrower than the slabs of base metal so that in the rolling operation the projecting edge portions of the slab will weld together, thereby isolating the strips of cladding metal for purposes hereinafter set forth.

While the present invention is not so limited, it will be described for convenience in connection with the cladding of iron or steel bodies with chromium steel or stainless steel strips.

In FIG. 1 there is shown a "sandwich" formed of two outer slabs 1a and 1b of the base metal, such as iron or steel. Between these slabs and in contact with them are positioned two relatively thinner strips of stainless steel 2a and 2b, which are separated from each other by a thin and uniform layer of a welding separator such as alumina or other light metal oxide.

The sandwich so formed is heated in a non-oxidizing atmosphere in a slab furnace to a temperature which is a forging temperature and is preferably at or around conventional temperatures for hot rolling, say 1900° to 2100° F. When all parts of the sandwich have uniformly been raised to the selected temperature, the sandwich is withdrawn from the furnace and introduced directly into a suitable planetary mill such, for example as the mill of the aforesaid Patent 2,710,550. The atmosphere of the furnace may range from neutral gases such as nitrogen or argon to reducing gases such as dissociated ammonia, DX gas or the like. For convenience in handling the sandwich and to prevent separation of the layers, the outer slab portions 1a and 1b may be tack-welded at intervals about the edges if desired; but with care in handling, this may be found unnecessary.

If a sufficient reduction is taken in the planetary mill, the temperature conditions at the mid-section of the sandwich, i.e. in the general plane of the stainless steel strips 2a and 2b, will be isothermal, or if desired an increase of temperature can be effected. Thus heat losses from the surfaces of the sandwich by radiation or conduction to the working rolls of the planetary assemblies will not affect the temperature at the interfaces between the stainless steel strips and the adjacent slabs. While depending upon the mill construction, mill speeds and feeding speed, as well as the materials being operated upon, the rate of reduction may be adjusted to suit conditions, reductions of the order of about 95% (or a 1:20 elongation) are both exemplary and preferred.

Under these conditions a firm welding of the stainless steel strips 2a and 2b and the respectively adjacent iron or steel portions 1a and 1b will readily occur. There is no need to coat the surface of the stainless steel strips with pure iron, or nickel, or other adhesion-promoting substance. Moreover, the edges of the ferrous slabs 1a and 1b (preferably extending laterally beyond the edges of the stainless steel strips by about ⅛ inch or more) will weld together during the rolling as is indicated at 4 in FIG. 2. This has certain advantages, facilitating the handling of the final and relatively thin rolled product in the form of coils, and also insuring that, if the cooling after rolling takes place in an oxidizing atmosphere, the surfaces of the stainless steel strips will be protected from oxidation.

It will now be evident that if the relatively thin rolled product, the manufacture of which has just been described, is edge-trimmed for the removal of those narrow lateral portions in which the base metal bodies have been welded directly to each other, the product can be separated into two single clad strips, i.e. strips each consisting of a base metal body clad on one side with a stainless steel layer. The welding separator 3 can easily be brushed or dusted from the stainless steel surfaces.

There is a substantial market for a single clad product of the character described; and the practice of the process steps hereinabove outlined makes possible the manufacture of such a product more cheaply, more certainly and with smaller scrap losses, and with a greater range of ratios of the thickness of the base metal body to the cladding metal. However, the present invention also contemplates the manufacture of other types of product.

FIG. 3 illustrates a procedure in which the sandwich 1 is fed into the planetary mill 12 by suitable feeding means such as the pinch rolls 11, and is there reduced to a desired gauge as hereinabove described. Immediately upon leaving the mill, the rolled product, which will be at a high temperature, is passed into a housing 13 which is kept filled with a reducing atmosphere. This housing may contain driven pinch rolls 13a where desirable for exerting tension upon the rolled product as it emerges from the planetary mill. Again, the rolls 13a may constitute a mill making a relatively small reduction in the composite rolled product, but serving to iron out any surface inequalities in the rolled product produced by the sequential action of the planetary working rolls. The reducing atmosphere in the housing 13 and in a cooling hood 29 attached thereto serves to reduce a very thin layer of oxide which will lie on the surfaces of the sandwich and to prepare these surfaces for the reception of molten coating metal. The cooling hood 29 will serve to lower the temperature of the rolled product to a point slightly above the temperature of a molten coating bath later described. If desired, the cooling hood may be provided with external circulatory means 15 for cooling the hood atmosphere, circulation being maintained by blower means 14.

The rolled product, upon cooling, is carried over a roll 16 at the end of the hood so as to direct it downwardly into a coating bath through a snout 29a. One end of the snout is connected in a gas tight fashion with the cooling hood while the other end of the snout dips beneath the surface of the coating bath. Thus the reduced surfaces of the rolled product are protected from oxidation until entry into the bath; and the arrangement is such that continuous hot coating may be accomplished without the use of flux.

The coating apparatus includes a pot 17 for a bath 21 of molten coating metal. Heating means (not shown) will usually be provided in connection with the pot. The molten coating metal may consist of any metal suitable for hot coating and suitable to the uses to which the product of this invention may be put. Thus, the coating metal may be tin, terne, cadmium, aluminum, aluminum alloys, zinc, or zinc containing a minor quantity of aluminum, by way of example. The temperature to which the rolled product will be cooled in the cooling hood 29 will depend upon the temperature of the molten coating bath 21 which, in turn, bears a relationship to the melting point of the coating metal. Thus a product to be galvanized may be cooled to a temperature of about 900° F. before immersion in a bath of zinc.

The rolled product may have a short path of travel through the bath around a return roll 18, exiting from the bath through exit rolls 23 or other suitable apparatus for controlling the thickness and uniformity of the coating.

The coated product, indicated at 19 will ordinarily be cooled in air, passing around the rolls 24 and being coiled at 25.

It will now be evident that if the rolled and coated product 19 is edge-trimmed as above described, it may be separated into two strips, each consisting of a base metal body clad upon one side and coated upon the other with the metal of the bath 21. By way of example the strips may each consist of a mild steel body clad upon one side with stainless steel and bearing on the opposite side a corrosion resistant metal such as zinc or aluminum. Such a clad product will be of particular utility especially in situations where it is exposed to the weather, where a stainless steel surfacing for economic or other reasons is desired upon one side only, but where the opposite side of the product requires protection from atmospheric or other corrosion.

FIG. 4 shows a modification of the process in which molten salt is substituted for a protective atmosphere. The rolled product 20, emerging from the bite of the planetary mill 12 can be protected from atmospheric oxidation by a spray of suitable salt, such as (but without limitation) anhydrous caustic soda. Spraying means are indicated at 30 ahead of the point where the rolled product passes through the rolls 13a hereinabove described.

The rolled product 20 can then be submerged in a bath 31 of molten salt floating on a lead bath 32 in a suitable vessel 33. Instead of lead, any other molten metal or alloy which does not dissolve iron may be used for the bath 32.

The vessel 33 will have a partition 33a so as to isolate from the molten salt a bath of molten coating metal 21 floating on the molten lead. Since lead is a good heat conductor, the bath 32 may be employed to cool the rolled product 20 to a desired temperature (e.g. about 900° F. in the case of zinc or about 1250° F. in the case of aluminum). The rolled product 20 will pass around guiding rolls 34 and 35 in the vessel 33, and will pass through the bath of molten coating metal, exiting through rolls 23 or other suitable exit apparatus. The cooling of the rolled product after coating may take place in air or in any other suitable cooling medium. It is shown in FIG. 4 as again passing around looping rolls 24 and being coiled at 25.

The coated rolled product will be generally similar to that described in connection with FIG. 3 and after edge-trimming may be separated into two strips bearing a cladding metal upon one side and a hot dip coating upon the other. Again by way of non-limiting example each such strip may consist of a mild steel body clad upon one face with stainless steel and protected upon the other face with a coating of zinc, say, about .001 to about .002 inch in thickness.

Figure 5:
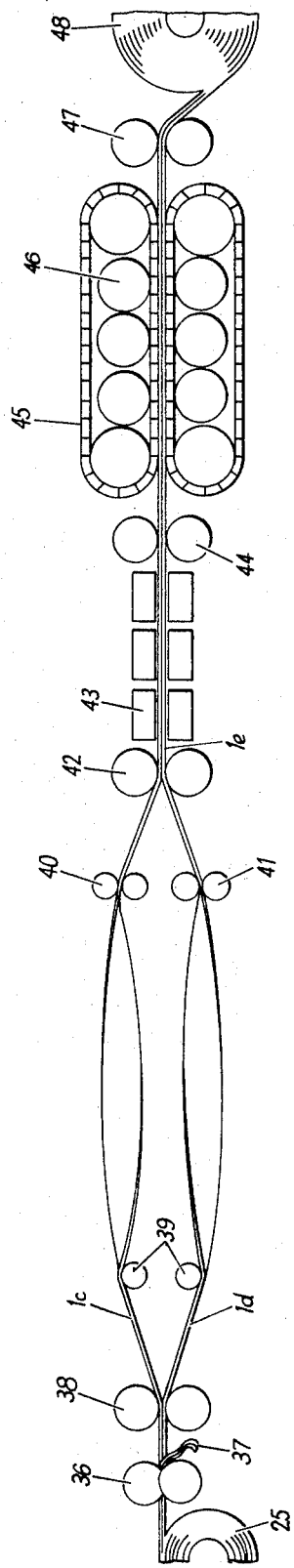
FIG. 5 is a schematic view of additional steps which may be performed on the products of FIGS. 3 and 4.

The invention further contemplates the manufacture of products which are clad on both outer surfaces. FIG. 5 illustrates one mode of manufacture of such products. The coil 25 previously described is edge-trimmed by suitable slitters 36, the narrow trimmings being carried away as at 37. The rolled product is then separated through the aid of a pair of rolls 38 to provide two single clad and coated strips indicated at 1c and 1d. These strips pass respectively over and under rolls 39 and, in a flight between these rolls and separated pinch roll sets 40 and 41, the strips are twisted through 180° so that the coated strip surfaces are now directed toward each other, the clad surfaces being directed oppositely. The strips are brought together in the new relationship by means of pinch rolls 42 to form a composite indicated at 1e. The composite is than passed through a furnace or between heating means 43 (which may be of the high frequency inductive type) so as to raise the temperature to a point above the melting temperature of the coating metal. The strips are pressed together as by one or more sets of rolls 44 so that the layers of coating metal on their inner surfaces will adhere together or interfuse. Upon cooling it will be found that the two strips are solidly brazed together by the coating metal. Cooling may be accomplished in any suitably way. In FIG. 5 the brazed composite is shown as passing between caterpillar cooling means 45 equipped with guiding and pressing rolls 46. A pair of pinch rolls 47 may be employed to draw the composite through the cooling means; and the composite may be recoiled as at 48, or cut apart into individual sheets.

An exemplary result of the operations illustrated in FIG. 5 will be a clad structure consisting of two base metal bodies, say, of mild steel, brazed together over their meeting surfaces with a lower melting point metal such as zinc or aluminum, and clad on their exterior surfaces with, say, stainless steel. Such a product is suitable for many uses. It can be readily formed, i.e. bent, and is also suitable for mild drawing operations. It may be subjected to heat excepting that temperatures closely approaching or beyond the melting temperature of the coating metal should be avoided to prevent separation. The product has the corrosion and weather resistance of double clad base metal bodies, but it costs considerably less than either a solid body of the cladding metal or a double clad base metal structure made by hitherto conventional methods.

Figure 6:
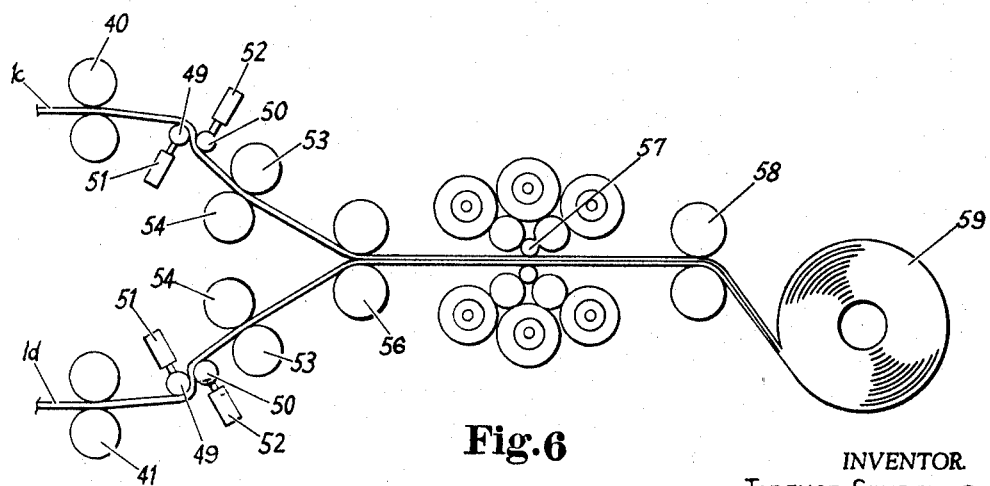
FIG. 6 is a partial view of a modification of certain of the steps illustrated in FIG. 5.

FIG. 6 illustrates a procedure which may be employed in producing a double clad body where the "brazed" construction is not acceptable. The original sandwich type rolled product is made on the planetary mill as hereinabove described and as illustrated in the left-hand portions of FIGS. 3 and 4. The rolled product will not be coated with molten metal, however, and as it emerges from the planetary mill it will preferably be coated with molten salt so as to protect it from oxidation, as indicated at 30 in FIG. 4. It may be passed through the rolls 13a as previously described; but will then be cooled and if desired coiled. It may be noted that many salts suitable for protecting the composite rolled product from surface oxidation are hygroscopic, and where this is the case and the composite is coiled and stored, precautions should be taken to protect the coils from humidity.

The cooled uncoated product if in coil form will next be decoiled as shown at the left-end of FIG. 5. It will be edge-trimmed and separated into two single clad strips; and the strips will be twisted to bring their clad surfaces to the outside, all as previously described. FIG. 6 begins with the pinch rolls 40 and 41 at the left-hand end, these elements corresponding to the elements having the same index numerals in FIG. 5. The separated strips 1c and 1d are next subjected to a relatively sharp deflection which will serve to break up and remove from their surfaces the adhered crystals of the protective salt. The deflection may be accomplished by pairs of relatively small rolls 49 and 50, the axes of these rolls being off-set from each other, and the rolls being relatively positionable by hydraulic means 51 and 52. It will be understood from FIG. 6 how the rolls may be positioned to produce a sharp deflection in each strip. Means not shown may be used to convey away the dislodged salt crystals, and these means will ordinarily include suction pipes for the removal of salt particles floating in the air so that they cannot settle back on the strip surfaces.

Figure 7:
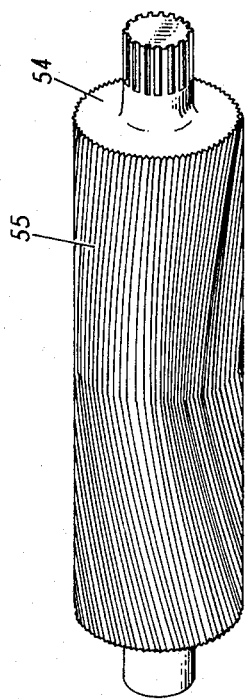
FIG. 7 is a perspective view of a surface-conditioning roll which may be used in the embodiment of FIG. 6.

It has been found that the clean surfaces of the base metal bodies of the strips may be adhered together by cold rolling providing the surfaces are roughened. To accomplish the roughening, the strips are individually passed through pinch roll combinations consisting of a smooth roll 53 contacting the clad surface of each strip and a rough roll 54 contacting the cleaned surface of the base metal on the opposite side of the single clad structure. For roughening the base metal surfaces rolls having a coarse shot-blasted surface can be used; but it is preferred to employ rolls 54 which, as illustrated in FIG. 7, have a surface configuration 55 in a herring-bone pattern characterized by very small teeth. There should be more than about 40 of these teeth per inch of circumference, the depth of the teeth being proportionately shallow. Also, the two rolls 54 acting separately upon the faces of the separate single clad strips should impress teeth or rugosities in these surfaces so directed that when the surfaces are brought together the rugosities will cross each other, preferably at an angle near 90°.

The effectiveness of a cold rolling operation in welding the cleaned surfaces of the base metal bodies together is believed to be due to an initial contact between the base metal surfaces at a plurality of spaced points produced by rugosities which are easily deformed. The strips, treated as described, are led together through a pair of pinch rolls 56 and into a cold mill 57. While various cold mills may be employed, it is preferred to use beam backed mills hitherto developed by the present inventor, certain forms of such mills being set forth in U.S. Letters Patent 2,776,586. Such mills make use of very small working rolls and hence are capable of producing single stage reductions of the order of 50% to 80%. Such mills also are not subject to substantial deflections by reason of the roll separating forces encountered in the operation of the mill, and they therefore produce a very flat rolled strip. They also have a very short roll bite.

The mills are used with front and back tensions which in the particular embodiment are produced by the pinch rolls 56 on the entrance side and pinch rolls 58 on the exit side. It will be understood that since the pinch rolls 56 and 58 are employed to create tensional forces they will ordinarily act as mills in producing a slight elongation in the strip. Depending upon the physical characteristics of the product being rolled, adequate adherence of the base metal bodies can usually be attained with moderate reductions in the mill 57, say around 20%, although heavier reductions may be preferred for special purposes.

The preparation of the exposed base metal surfaces of the individual single clad strips which has been described above is generally adequate. A more drastic preparation can be achieved by driving the roughened rolls at a speed different from the speed of the strips. This produces minute scratches on the surfaces of the strips a small fraction of a second before the strips are combined and subjected to some reduction, whereby the surfaces become sealed from the atmosphere. It has been found that the existence of some scale or oxide particles at the meeting surfaces of the base metal bodies is not detrimental to the ultimate bond providing the surfaces are brought together and caused to adhere by a working and reduction step as described, where the surface condition is such that fresh metal will be brought against fresh metal. In some instances, especially where the metal at the surface of the base metal bodies is scratched or scraped as above described, it has been found possible to eliminate the use of the salt application.

When the base metal surfaces of the strips have been caused to adhere in the ways set forth above, the metal composite is subjected to a final step following the cold rolling, namely an annealing step in which the composite structure is raised to a temperature above the lower recrystallization point of the base metal. This anneal serves to convert the adherence between the base metal surfaces into a solid welded bond. The anneal may be carried on in various ways either as a continuous heat treatment or as a treatment in a box or muffle. It should be carried on under a protective atmosphere of neutral or reducing gas as will be readily understood by the skilled worker in the art. Preferably also the anneal is carried out with the material subjected to mechanical pressure tending to press the parts of the composite structure together.

One of the easiest ways in which this can be done is to coil the composite structure as at 59 under tension, and then anneal the tightly wound coil without rewinding. The coiler on which the coil 59 is produced may be used to produce the exit tension on the cold rolling mill or mills, the coil being banded or otherwise kept from loosening. Whereas in conventional procedures for annealing coils in a box or muffle, precautions must be taken against the sticking of the convolutions together, such precautions usually involving the use of an annealing separator or the formation of coils with loose convolutions, in the process of this invention the convolutions of the coiled composite being faced with chromium steel or stainless steel will exhibit no tendency toward sticking. It will be understood also that the anneal just described renders the composite ductile, i.e. eliminates the strains produced by the cold rolling reduction.

The described combination of three cold rolling instrumentalities has been found to be the most efficient way of producing acceptable quality double clad strips at low cost. Other reducing instrumentalities may be substituted, however, and the product may be successfully produced through the employment of a single cold rolling mill.

The product as last described will, in the exemplary embodiment consist of a body of iron or mild steel clad on both surfaces with stainless steel.

Modifications may be made in the invention without departing from the spirit of it.

The invention having been described in certain exemplary embodiments, what is claimed as new and desired to be secured by Letters Patent is:

1. A process of producing clad structures from a base metal and a cladding metal which does not readily weld with the base metal, which process comprises the steps of forming a composite structure consisting, in the order named, of a first body of the base metal, a first layer of cladding metal, a layer of welding separator, a second layer of cladding metal and a second body of base metal, the said composite structure constituting a slab, heating the said slab to a hot rolling temperature in non-oxidizing conditions and passing the said slab through a planetary mill and effecting therein a reduction of the order of at least about 20:1 whereby temperature conditions at the mid-section of said slab during the said reduction are maintained at least substantially isothermic and high enough to weld the cladding metal to the base metal, and thereafter separating the rolled composite into two single clad strips.

2. The process claimed in claim 1 wherein the base metal bodies extend slightly beyond the edges of the cladding metal layers and become welded together during the aforesaid rolling, and wherein the welded edge portions of the base metal bodies are trimmed away in the rolled product to permit separation into the aforesaid strips.

3. The process claimed in claim 2 wherein the base metal is chosen from a class consisting of iron and mild steel and wherein the cladding metal is chosen from a class consisting of chromium steel and stainless steel.

4. The process claimed in claim 2 wherein prior to the edge trimming of the rolled metal composite the outer surfaces thereof are cleansed of oxide and coated by hot dipping with a molten coating metal, whereby to produce after edge trimming and separation composite base metal strips each clad upon one side and hot coated on the other.

5. The process claimed in claim 2 wherein the separated strips have their base metal surfaces roughened, then brought together and subjected to a substantial cold rolling reduction whereby the base metal surfaces are caused to stick together, and wherein the composite is then heated to a temperature above the lower recrystallization point of the base metal while under pressure, whereby to weld the base metal bodies together.

6. The process claimed in claim 4 wherein the base metal is a material chosen from a class consisting of iron and mild steel, wherein the cladding metal is chosen from a class consisting of chromium steel and stainless steel, and wherein the coating metal is chosen from a class consisting of tin, terne, cadmium, aluminum, zinc and alloys thereof.

7. The process claimed in claim 4 wherein the rolled composite in heated condition is introduced as it emerges from the planetary mill into a chamber filled with reducing gas whereby to reduce oxides upon its surface and is led beneath the surface of a bath of the molten coating metal while still protected by the said reducing atmosphere.

8. The process claimed in claim 4 including the steps of bringing the separated strips together with their coated sides in contact and heating the strips to a temperature above the melting point of the coating metal while pressing them together, and cooling the metal composite whereby to produce a structure characterized by two bodies of the base metal brazed together by means of the coating metal and clad on their outer surfaces.

9. A process of producing a base ferrous metal strip clad on both sides with a more refractory metal which does not easily weld with the base metal, which process consists in producing two single clad strips by superposing on a body of the base metal a first sheet of the cladding metal, a welding separator, a second sheet of the cladding metal and a second body of the base metal and subjecting the composite structure to a heavy reduction at a forging temperature, thereafter separating the single clad strips, reversing them so that the cladding metal layers lie to the outside, superposing the reversed strips and effecting a bond between adjacent surfaces of the base metal bodies.

10. The process claimed in claim 4 wherein the rolled composite emerging from said planetary mill is scale free, and prior to the formation of oxide thereon, said rolled composite is covered by spraying with a molten salt and delivered into the coating bath.

References Cited

UNITED STATES PATENTS

| | | | |
|---|---|---|---|
| 3,224,088 | 12/1965 | McNelly | 29—470.9 |
| 3,132,418 | 5/1964 | Pulford | 29—471.1 |
| 2,961,761 | 11/1960 | Watson et al. | 29—470.9 |
| 2,926,103 | 2/1960 | Brick | 117—51 |
| 2,918,388 | 12/1959 | Moller | 117—51 |
| 2,570,906 | 10/1951 | Alferieff | 117—51 |
| 2,442,485 | 6/1948 | Cook | 117—50 |
| 2,156,607 | 5/1939 | Schon | 117—51 |
| 1,886,615 | 11/1932 | Johnson | 29—470.9 |
| 2,718,690 | 9/1955 | Ulam | 29—471.5 |
| 2,744,314 | 5/1956 | Kinney | 29—471.5 |
| 2,337,083 | 12/1943 | Cape | 29—196.1 |
| 2,537,207 | 1/1951 | Carlson | 29—196.1 |

FOREIGN PATENTS

| | | |
|---|---|---|
| 883,359 | 11/1961 | Great Britain. |

CHARLIE T. MOON, *Primary Examiner.*

HYLAND BIZOT, *Examiner.*

J. L. CLINE, *Assistant Examiner.*